United States Patent
Santharam et al.

(12)
(10) Patent No.: US 11,776,068 B1
(45) Date of Patent: Oct. 3, 2023

(54) VOICE ENABLED CONTENT TRACKER

(71) Applicant: INTUIT INC., Mountain View, CA (US)

(72) Inventors: Sangeetha Uthamalingam Santharam, San Diego, CA (US); Bridget Diane Kimball, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 17/876,716

(22) Filed: Jul. 29, 2022

(51) Int. Cl.
*G06Q 40/12* (2023.01)
*G06F 3/0484* (2022.01)
*G06Q 40/10* (2023.01)
*G10L 15/22* (2006.01)
*G10L 15/18* (2013.01)
*G06F 3/16* (2006.01)

(52) U.S. Cl.
CPC ......... *G06Q 40/123* (2013.12); *G06F 3/0484* (2013.01); *G06F 3/167* (2013.01); *G06Q 40/10* (2013.01); *G10L 15/18* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 5,822,741 A * | 10/1998 | Fischthal | G06Q 40/08 705/31 |
| 8,694,395 B2 * | 4/2014 | Houseworth | G06Q 40/10 705/31 |
| 10,373,268 B1 * | 8/2019 | Orphys | G06Q 40/123 |
| 10,592,995 B1 * | 3/2020 | Ouyang | G06Q 40/123 |
| 2002/0013747 A1 * | 1/2002 | Valentine | G06Q 40/123 705/31 |
| 2007/0005509 A1 * | 1/2007 | Spiller | G06Q 99/00 705/65 |
| 2008/0120129 A1 * | 5/2008 | Seubert | G06Q 40/125 705/305 |
| 2010/0312726 A1 * | 12/2010 | Thompson | G06N 20/00 706/54 |
| 2011/0231399 A1 * | 9/2011 | Zhang | G06K 9/6222 707/E17.089 |
| 2011/0313767 A1 * | 12/2011 | Duffield | H04M 3/4936 704/E15.001 |

(Continued)

*Primary Examiner* — Fateh M Obaid
(74) *Attorney, Agent, or Firm* — Patterson + Sheridan, LLP (57) ABSTRACT

Certain aspects of the present disclosure provide techniques and systems for automatically detecting, tracking, and processing certain information content, based on voice input from a user. A voice enabled content tracking system receives natural language content corresponding to audio input from a user. A determination is made as to whether the natural language content includes a first type of information, based on evaluating the natural language content with a first machine learning model. In response to determining the natural language content comprises the first type of information, a temporal association of the first type of information is determined, based on evaluating the natural language content with a second machine learning model, and a message including an indication of the temporal association of the first type of information is transmitted to the user.

20 Claims, 4 Drawing Sheets

(56) References Cited

U.S. PATENT DOCUMENTS

| | | | |
|---|---|---|---|
| 2014/0095173 A1* | 4/2014 | Lynch | G06F 3/167 |
| | | | 704/275 |
| 2014/0324648 A1* | 10/2014 | Mori | H04W 12/06 |
| | | | 705/31 |
| 2015/0340033 A1* | 11/2015 | Di Fabbrizio | G10L 15/1815 |
| | | | 704/254 |
| 2017/0195731 A1* | 7/2017 | Girlando | H04N 21/4312 |
| 2018/0039609 A1* | 2/2018 | Berkland | G06F 40/174 |
| 2018/0157800 A1* | 6/2018 | Ravishankar | G16H 50/50 |
| 2022/0121881 A1* | 4/2022 | Shaaban | G06V 30/414 |

* cited by examiner

VOICE ENABLED CONTENT TRACKER

INTRODUCTION

Aspects of the present disclosure relate to natural language processing, and more specifically to techniques for automatically detecting, tracking, and processing certain information content (e.g., tax expense information), based on analysis of voice content from a user.

Complex software applications and services are frequently made available to users over computer networks. For example, software applications used to prepare and file income tax returns are frequently offered as an online service. In addition to generating tax return documents, these online services typically guide a user through a collection of complex interactive workflows in order to prepare a complete, valid income tax return. Further, in attempt to increase user satisfaction with the application, these services generally attempt to maximize the user's tax refund (e.g., by maximizing tax deductions, tax credits, etc.).

One challenge with current tax preparation applications is that it is significantly difficult to consolidate tax expense information in the tax preparation application at a point of need. For example, many tax preparation applications generally rely on the user to manually store and track tax expense information over time (e.g., throughout the year) and input the tax expense information into the tax preparation application when the user is in the process of preparing a tax return. However, many users find it challenging to keep track of expense information over time. For example, users may not be able to remember when the expense occurred, may not know whether the expense qualifies as a tax expense, and/or may not be able to determine which expenses will lead to a tax benefit.

Accordingly, there exists a need for an improved approach for tracking information content, such as tax expense information.

SUMMARY

Certain embodiments provide a method. The method generally includes receiving natural language content corresponding to audio input from a user. The method also includes determining whether the natural language content comprises a first type of information, based on evaluating the natural language content with a first machine learning model. The method also includes, in response to determining the natural language content comprises the first type of information: determining a temporal association of the first type of information, based on evaluating the natural language content with a second machine learning model, and transmitting to the user a message comprising an indication of the temporal association of the first type of information.

Other embodiments provide a method for automatically tracking tax expense information based on audio input from a user. The method generally includes receiving natural language content corresponding to audio input from a user. The method also includes determining whether the natural language content comprises tax expense information, based on evaluating the natural language content with a first machine learning model. The method also includes, in response to determining the natural language content comprises the tax expense information: determining a type of the tax expense information based on the evaluation; determining which tax filing period of a plurality of tax filing periods are associated with the type of the tax expense information, based on evaluating the natural language content with a second machine learning model; and automatically processing the type of the tax expense information on behalf of the user. Automatically processing the type of the tax expense information includes associating the type of the tax expense information with at least one content item, based on the tax filing period associated with the type of the tax expense information, and storing the type of the tax expense information in a storage system in association with the at least one content item. The method also includes presenting the type of the tax expense information and the associated tax filing period on a user interface of a computing device associated with the user. The method further includes providing one or more elements within the user interface that allow the user to at least one of (i) verify the tax filing period associated with the type of tax expense information, (ii) modify the tax filing period associated with the type of tax expense information, or (iii) remove the type of tax expense information from the at least one content item.

Other embodiments provide processing systems configured to perform the aforementioned methods as well as those described herein; non-transitory, computer-readable media comprising instructions, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for automatically detecting and tracking certain information content (e.g., tax expense information), based on analysis of voice content.

As noted above, it can be significantly challenging for users to track expenses for tax filing purposes. Many tax preparation applications generally rely on users (e.g., customers) to identify, store, and track tax expense information over time and input the information into a tax preparation application during the process of filing a tax return. This significant amount of user involvement can reduce user satisfaction with tax preparation applications, which in turn can lead to users discontinuing use of such applications.

The present disclosure provides systems and techniques for automatically detecting, tracking, and processing certain information content, such as tax expense information, based on voice input from a user. In certain embodiments described herein, an online service (including one or more computing systems) employs voice recognition software to process a user's voice/speech. For example, a user can interact with a software application (provided by the online service) using a voice-user interface (VUI). The user can voice/speech to initiate services or processes in the software application, navigate application content provided by the software application, etc. In the case of an online service that provides a tax preparation application, a user can use voice/speech to interact with an interactive workflow (provided by the tax preparation application) in order to prepare and file a tax return, search application content, navigate application features, and the like. To the extent the user does use their voice to interact with the application, the online service can capture the user's voice/speech as an audio stream (e.g., audio input) and process the audio stream to extract text content from the audio stream.

In certain embodiments, an online service can obtain natural language content corresponding to audio input of a user (e.g., the user's voice/speech). For example, the natural language content may be obtained from a computing device (or system) associated with the user. For instance, the computing device may capture the user's audio input via a VUI, generate natural language content corresponding to the user's audio input using one or more natural language processing algorithms, and transmit the natural language content to the online service.

In certain embodiments, the online service may generate (at the online service) the natural language content corresponding to audio input of a user (e.g., the user's voice/speech). For example, the online service may receive audio input of a user from a computing device and generate natural language content corresponding to the user's audio input, using one or more natural language processing algorithms. The computing device that captures the user's audio input and/or generates the natural language content may be a mobile device (e.g., smartphone, tablet, personal digital assistant (PDA), etc.) equipped with a VUI, a wearable device (e.g., smartwatch, smart glasses, etc.) equipped with a VUI, a smart home device (e.g., smart speaker, smart television, game console, etc.) equipped with a VUI, etc.

Upon obtaining the natural language content, the online service can determine whether the natural language content includes a particular type of information (e.g., tax expense information, including a type of the tax expense information) based on evaluating the natural language content with a machine learning (ML) model. For example, the ML model may be trained to output an indication of a type of tax expense information from multiple different types of tax expense information, based on the natural language content. Examples of different types of tax expense information include, but are not limited to, charitable donations, child care expenses, rental home expenses (including repairs, renovations, etc.), education costs (e.g., tuition, books, printing, etc.), moving costs (e.g., truck rental, packaging, etc.), home buying costs, business related tax expenses (e.g., equipment costs, etc.), self-employed tax expenses (e.g., work from home costs, vehicle and mileage expenses, etc.), and the like. In one reference example, assuming a user makes the statement "I made a $200 donation to Charity A," the online service may determine that the statement should be classified as a charitable donation and may determine that the amount of the charitable donation is "$200."

Upon determining that the natural language content includes a particular type of information, the online service can determine a temporal association of the type of information, based on evaluating the natural language content with another ML model. In certain embodiments, this ML model may be trained to output an indication of tax filing period associated with the type of information (e.g., type of tax expense information), based at least in part on the natural language content and/or metadata associated with the natural language content.

For example, assuming the user's statement is "I made a $200 donation to Charity A," the online service may determine the associated tax filing period based on whether the user has completed taxes for the current year and based on when the charitable donation occurred. For instance, if the user has completed taxes for the current tax filing period, the online service may determine that the charitable donation should be associated with the next tax filing period. On the other hand, if the user has not completed taxes for the current tax filing period, the online service may determine the associated tax filing period based on information indicating when the charitable donation occurred.

In some embodiments, the online service can prompt the user to input the information indicating when the tax expense (e.g., charitable donation) occurred. For example, the online service can generate and send a link to the user allowing the user to upload the information (e.g., receipt for the charitable donation). In another example, the online service may generate a query asking the user for the information. The query may be sent to the user via the user's computing device and may be a voice query, a message presented on the computing device's user interface, etc. In yet another example, the online service may determine the information based on the natural language content (e.g., the natural language content may include an indication of when the tax expense occurred).

In certain embodiments, the online service can automatically process the type of information based on the temporal association. Continuing with the above charitable donation example, the online service can automatically apply the charitable donation to a tax return for the associated tax filing period. The online service may also generate and transmit a message to the user (e.g., via the user's computing device) indicating that the type of information has been successfully processed (e.g., the tax expense information has been successfully applied to the user's tax return for the associated tax filing period). In certain embodiments, the message may also include a link that allows the user to upload at least one content item (e.g., tax receipt and other documentation) associated with the type of information.

In certain embodiments, when the online service determines that the natural language content does not include a particular type of information (e.g., tax expense information), the online service may generate and transmit a message to the user (e.g., via the user's computing device) indicating that the type of information is not valid (e.g., not a valid tax expense) and that the type of information has not been processed (e.g., the type of information has not been applied to the user's tax return).

In certain embodiments, the online service may present the type of information along with the temporal association for the type of information on a user interface of the user's computing device. In one example, when the user accesses the online service to initiate preparation of a tax return for a particular tax filing period, the online service may present an indication of the tax expense information associated with that tax filing period. Along with presenting this information, the online service may present one or more elements that allow the user to confirm applying the tax expense information to the tax return, verify the temporal association, modify the temporal association, delete (or remove) the tax expense information without applying it to the tax return, etc.

Advantageously, by automatically detecting, tracking, and processing tax expense information based on a user's voice input, embodiments herein can track and process tax expense information at a point of need (e.g., substantially at or near when the tax expense occurs) over time (e.g., throughout the year), as opposed to relying on the user to save and remember a substantial amount of information over time and input the information during the process of preparing a tax return. As such, embodiments significantly improve user experience with tax preparation applications, which can increase the retention of users of the online service.

Note, certain embodiments are described herein using an online tax-preparation service as an example of computer software and an online software service, etc., that automatically detects, tracks, and processes information content (e.g., tax expense information) for a user based on the user's voice input. One of ordinary skill in the art will recognize that the techniques described herein may be adapted for use by a broad variety of software applications, online or web services, software features, or support services where users can use voice/speech to interact with the software. Additionally, it should be noted that although, in certain examples described herein, the computing system that obtains natural language content (corresponding to audio input from the user) is described as performing certain tasks (e.g., determining a type of tax expense information, determining a temporal association for the type of tax expense information, etc.), such tasks may be performed by one or more additional computing devices that the computing system that obtains the natural language content is in communication with (e.g., via a wired or wireless network), or vice versa. For example, the audio input, control signals, and information for display may be communicated between the computing devices, such as described with respect to FIG. 1.

Figure 1:
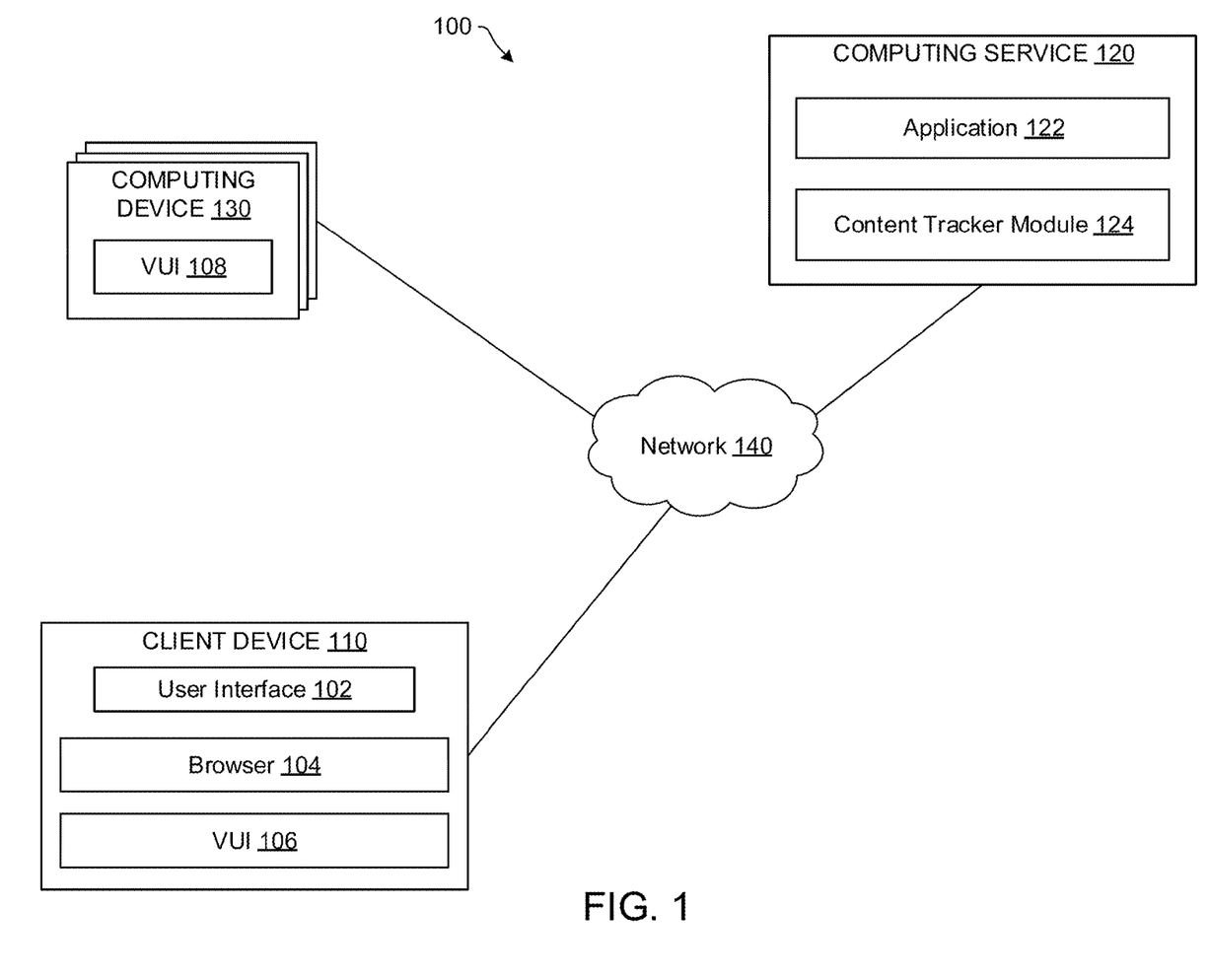
FIG. 1 depicts an example computing environment in accordance with certain embodiments.

FIG. 1 illustrates an example computing environment 100 in accordance with certain embodiments of the present disclosure. Generally, FIG. 1 and the following description are intended to provide a brief, general description of a suitable computing environment in which the embodiments described herein may be implemented. As shown, computing environment 100 includes a client device 110, one or more computing devices 130, and a computing service 120, which are interconnected via a network 140, such as a local area network, personal area network, cellular network, or wide area network (e.g., the Internet).

A user (e.g., customer) may use the client device 110 to interact with the computing service 120 and/or other computing systems (or devices) (e.g., computing device(s) 130). Similarly, a user may use the computing device(s) 130 to interact with the computing service 120 and/or other computing systems (or devices) (e.g., client device 110). Client device 110 is representative of a variety of computing devices, including, for example, a personal computer, a laptop, a tablet computer, a notebook, a personal digital assistant (PDA), a mobile device (e.g., smartphone), smartwatch, smartglasses, smart television, or any other computing device capable of communicating with the computing service 120 and/or computing device(s) 130 across network 140. The client device 110 includes a user interface 102 and a browser 104. The client device 110 may access the browser 104 via the user interface 102.

Computing device(s) 130 is representative of a variety of computing devices capable of communicating with the computing service 120 and/or client device 110. In one example, the computing device 130 is a smart home device, examples of which include, but are not limited to, smart speakers, smartlock, smart doorbell, smart thermostat, smart keychain, etc. Although not shown, one or more of the computing device(s) 130 may include a user interface and/or a browser for interacting with the computing service 120 and/or controlling one or more features of the computing device 130.

The client device 110 and/or the computing device(s) 130 can be used to access web and application services provided by the computing service 120. As shown, the computing service 120 provides a web application 122. The browser 104 of client device 110 can communicate with the computing service 120 to render web pages from the web application 122. Similarly, one or more of the computing device(s) 130 that include browsers can communicate with the computing service 120 to render web pages from the web application 122. In certain embodiments, one or more of the computing device(s) that do not include browsers can communicate with the computing service 120 to provide application content from the web application 122 to a user. The application content may be rendered via voice, messages transmitted to the client device 110, etc. In general, the computing device(s) 130 and client device 110 can use any number of communication methods to communicate with the computing service 120, including remote procedure calls, application programming interface (API) calls, Simple Object Access Protocol (SOAP)-based web services, remote file access, proprietary client-server architectures, and the like. Functionality attributed to the web application 122 may be applied using code executed by the computing service 120, code executed by the client device 110 via the browser 104, code executed by the computing device(s) 130, or a combination of both server-side code and client-side code. Note that, in certain embodiments, a standalone dedicated application that executes on the client device 110 may be used instead of the browser 104.

Computing service 120 can include a physical computing system(s) and/or virtual server device(s) (for example, in a data center) that execute online applications, including one or more services that perform functions associated with online applications (e.g., web application 122). In certain embodiments, the computing service 120 can be modeled as a web server(s), application server(s), and a database(s) that provide the service back-end for the web application 122. In such embodiments, the web server(s) may communicate with the application server(s) to respond to requests from the browser 104 on the client device 110 and/or requests from the computing device 130. The web server(s) and/or application server(s) may retrieve application content from the database(s) to respond to requests from the browser 104 (and/or computing device 130) and/or store application content into the database(s).

The application server(s) may execute a number of components (also referred to as modules) to provide web-based and other content to the client device 110 and/or computing device(s) 130. The application server(s) include application content (e.g., graphical user interface (GUI) components)

that the computing service 120 can present on the user interface 102 of client device 110 and/or a user interface (not shown) on a computing device 130. The application content that is presented may be based on a user's (e.g., customer, support agent, etc.) interaction with the web application 122 provided by the computing service 120. For example, the web application 122 may be used to prepare and file tax return documents and may present application content which guides a user through preparing a tax return as well as provide the user with access to a variety of related features (e.g., customer support). In another example, the web application 122 may be a financial management application that allows users to track and manage finances, monitor credit reports, set up bank accounts, build portfolios, trade shares, etc.

The application content can include, for example, Hyper-Text Markup Language (HTML) components or code that generates HTML components that can be passed to client device 110 and rendered as a user interface. The application content may additionally include instructions executable by client device 110 to display on the user interface 102 using language-specific or operating systems-specific application content (e.g., instructions for generating/displaying javascript based components or similar components on other operating system platforms, Abstract Window Toolkit or Swing API components on the Java platform, and so on.). Generally, instructions capable of rendering application content on client device 110 may include computer executable code generated from compiling and/or interpreting C (or variants thereof), Java, PHP, Ruby, HTML, javascript, Python, AJAX, VBscript, and other programming or scripting languages used to compose and present application content.

In certain embodiments, the computing service 120 allows users to interact with the computing service 120 (including web application 122) using voice/speech (e.g., audio input). As shown in FIG. 1, in certain embodiments, the computing device(s) 130 includes a VUI 108 and the client device 110 includes a VUI 106. The VUIs 106, 108 are generally configured to capture a user's voice/speech (e.g., audio input), such as via a microphone coupled to or integrated with the client device 110 and/or computing device(s) 130. In certain embodiments, the VUIs 106, 108 may transmit the audio input, via the network 140, to the computing service 120. In these embodiments, the computing service 120 may determine natural language content corresponding to the audio input. For example, the computing service 120 may identify text (e.g., words, query, etc.) of the audio input of the voice/speech of the user (e.g., by using natural language processing techniques to convert speech to text).

In other certain embodiments, the VUIs 106, 108 may determine natural language content corresponding to the audio input and transmit the natural language content to the computing service 120. For example, the VUIs 106, 108 may identify text (e.g., words, query, etc.) of the audio input of the voice/speech of the user (e.g., by using natural language processing techniques to convert speech to text).

In certain embodiments, the computing service 120 is configured to automatically detect, track, and process certain information content (e.g., tax expense information), based on the user's voice input. For example, the user's voice input may include a query to process a particular type of tax expense of the user. For instance, the user may request the computing service 120 to "Add a charitable donation of $100 to Charity X on Date Y to the user's tax return." In another instance, the user may request the computing service 120 to "Process a child care payment to Daycare A on Date Z." In yet another instance, the user may state to the computing service 120 that "My vehicle expenses for work today totaled $50." Note, however, that these are merely reference examples of a user using voice/speech to interact with the computing service 120.

Upon obtaining natural language content corresponding to the user's audio input, the computing service 120 may process the natural language content to automatically detect, track, and process certain information content (e.g., tax expense information) that may be included within the natural language content. As shown, the computing service 120 includes a content tracker module 124, which is configured to implement one or more techniques described herein to detect, track, and process information content, based on the user's voice input. The content tracker module 124 can include software components, hardware components, or combinations thereof. Note, the content tracker module 124 is described in more detail below.

Note that FIG. 1 illustrates a reference example of a computing environment in which the techniques described herein may be implemented and that the techniques described herein may be implemented in other computing environments consistent with the functionality described herein.

Figure 2:
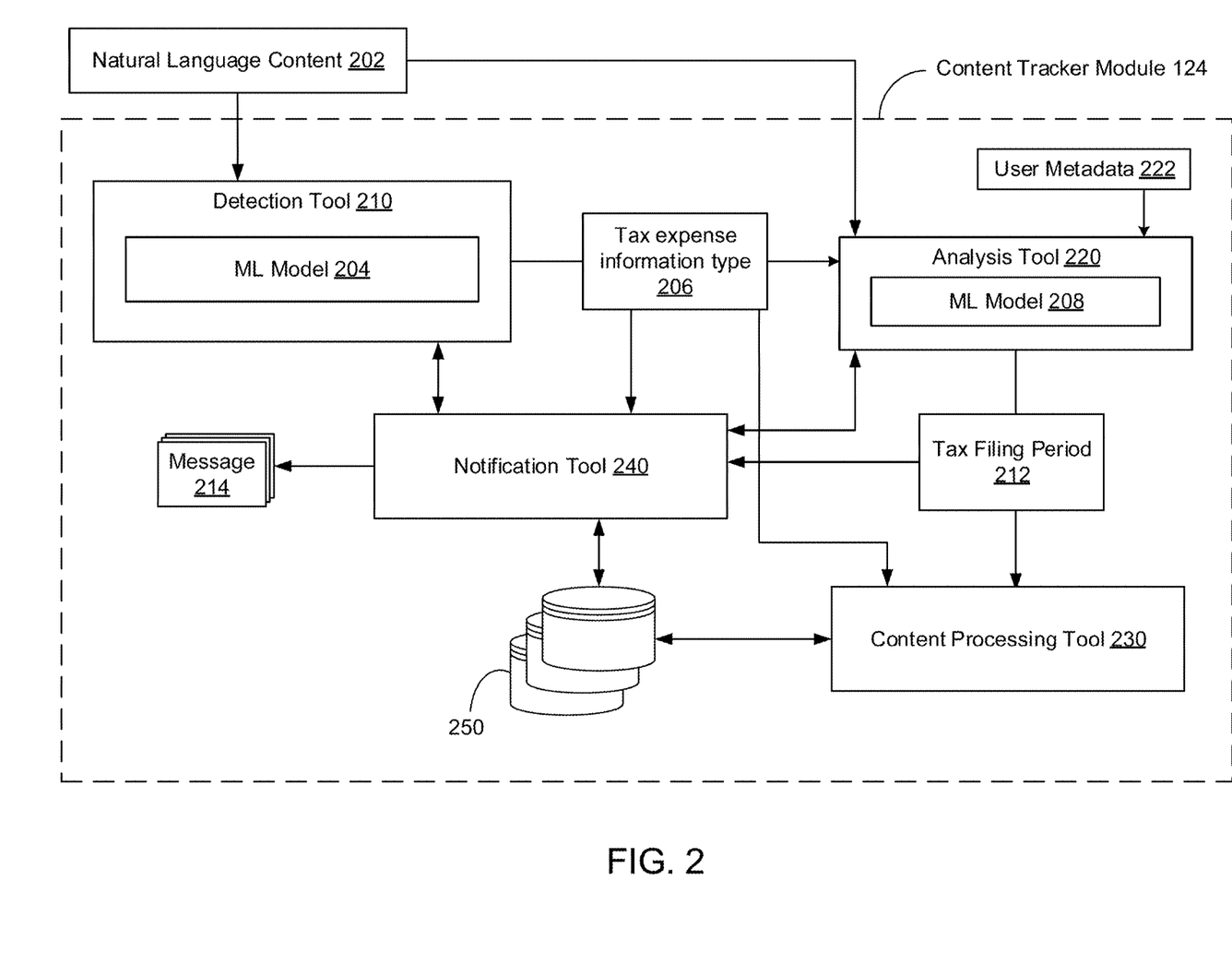
FIG. 2 further illustrates certain components of the computing environment depicted in FIG. 1, in accordance with certain embodiments.

FIG. 2 further illustrates certain components (e.g., content tracker module 124) of the computing environment depicted in FIG. 1, in accordance with certain embodiments. As shown, the content tracker module 124 includes a detection tool 210, an analysis tool 220, a content processing tool 230, a notification tool 240, and one or more storage systems 250, each of which can include hardware components, software components, or combinations thereof.

The detection tool 210 is generally configured to determine whether natural language content 202 (corresponding to audio input of a user) includes a particular type of information, such as tax expense information. Here, for example, the detection tool 210 receives natural language content 202 from a computing device (e.g., client device 110 and/or computing device(s) 130,) which captures audio input from the user. The detection tool 210 evaluates (or analyzes) the natural language content 202 using a ML model 204 to determine a type of tax expense information 206 (or tax expense information type) from multiple types of tax expense information (e.g., charitable donations, child care expenses, rental home expenses, business related expenses, self-employed expenses, etc.). The ML model 204 may be trained on multiple different natural language variations for each type of tax expense information.

The analysis tool 220 is generally configured to determine a tax filing period 212 for the tax expense information type 206. As shown in FIG. 2, the analysis tool 220 evaluates the natural language content 202 with a ML model 208 to determine the tax filing period 212 associated with the tax expense information type 206. The tax filing period 212 may be one of multiple tax filing periods. In certain embodiments, the ML model 208 is configured to evaluate the natural language content 202 to determine an occurrence of the type of tax expense information 206. For example, in some cases, the natural language content 202 may include an indication of when the tax expense occurred (e.g., the natural language content 202 may indicate that the tax expense occurred on particular date).

In certain embodiments, the ML model 208 is configured to evaluate the natural language content 202 and user metadata 222 to determine an occurrence of the type of tax expense information 206. The user metadata 222 may include a history of completed tax returns for different tax filing periods for the user. For example, the user metadata 222 may indicate whether the user has completed a tax return for the current tax filing period. In one embodiment, the ML model 208 may determine the associated tax filing period based on whether the user has completed a tax return for the current tax filing period. For example, if the natural language content 202 (corresponding to a user's audio input) is received after the user has completed a tax return for the current tax filing period, then the ML model 208 may determine that the tax expense information type 206 is associated with a next (or subsequent) tax filing period.

In another example, if the natural language content 202 (corresponding to a user's audio input) is received before the user has completed a tax return for the current tax filing period, then the ML model 208 may determine whether the tax expense information type 206 is associated with the current tax filing period or next tax filing period, based on information indicating when the tax expense occurred. In certain embodiments, the analysis tool 220 may interact with the notification tool 240 to prompt the user for information indicating when the tax expense information type 206 occurred. For example, the notification tool 240 may generate a message 214 including at least one of a query for the information indicating when the tax expense information type 206 occurred or a link allowing the user to upload information indicating when the tax expense information type 206 occurred. The notification tool 240 may transmit the message 214 to a computing device association with the user (e.g., client device 110).

The content processing tool 230 is generally configured to automatically process the tax expense information type 206 based on the associated tax filing period 212. For example, the content processing tool 230 may obtain (or determine) a tax return that is associated with the tax filing period 212 and may store the tax expense information type 206 (along with other associated information from the natural language content 202, such as the amount of the tax expense information type 206, an occurrence of the tax expense information type 206, etc.) in a storage system 250 in association with the respective tax return corresponding to the tax filing period 212.

The notification tool 240 is generally configured to generate and transmit an indication of whether the tax expense information type 206 has been processed (e.g., added to a user's relevant tax return). As shown, the notification tool 240 generates one or more messages 214. In certain embodiments, the notification tool 240 may generate a message 214 indicating that the tax expense information type 206 has been successfully processed. In these embodiments, the message 214 may include a link allowing the user to upload at least one content item (e.g., receipt, documentation, etc.) associated with the tax expense information type 206. The notification tool 240 may retrieve at least one content item uploaded by the user and may store the at least one content item into a storage system 250.

In certain embodiments, when the detection tool 210 determines that the natural language content 202 does not include tax expense information, the notification tool 240 may generate a message 214 indicating that the natural language content 202 does not include valid tax expense information.

In certain embodiments, the content processing tool 230 is also configured to present an indication of the tax expense information type 206 (along with the associated tax filing period 212) to the user via the user's computing device (e.g., client device 110). For example, the content processing tool 230 may retrieve the tax expense information type 206 from the storage system 250 where it is stored in association with a corresponding tax return based on the associated tax filing period 212. In addition to presenting the indication of the tax expense information type 206, the content processing tool 230 may provide one or more elements allowing the user to confirm adding the tax expense information type 206 to the user's tax return, remove the tax expense information type 206 from the user's tax return, verify the tax filing period 212, modify the tax filing period 212, etc.

Note that FIG. 2 illustrates a reference example of components of a content tracker module 124 and that the content tracker module 124 may have different set of components consistent with the functionality described herein. For example, while FIG. 2 describes the content tracker module 124 receiving natural language content 202 corresponding to a user's audio input, in certain embodiments, the content tracker module 124 may be configured to receive the user's audio input and generate natural language content 202 corresponding to the received audio input.

Figure 3:
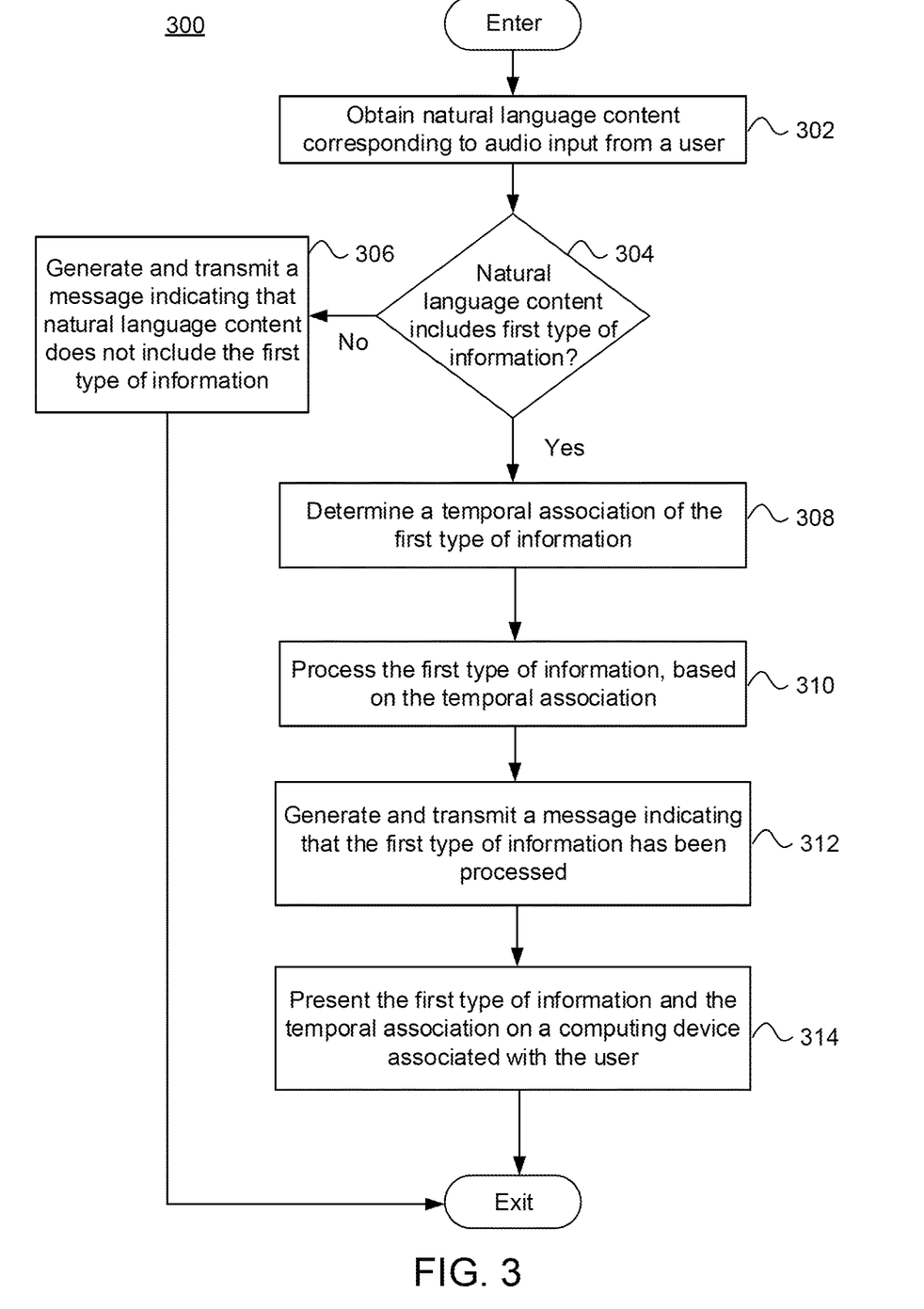
FIG. 3 illustrates an example flowchart for perform content tracking based on audio input from a user, in accordance with certain embodiments.

FIG. 3 illustrates an exemplary flowchart 300 for automatically detecting, tracking, and processing certain information content based on audio input from a user in accordance with certain aspects of the present disclosure. Flowchart 300 can be implemented by the computing service 120 of FIG. 1. FIG. 3 illustrates the functionality and operation of possible implementations of systems, methods and computer program products according to various embodiments of the present disclosure. In this regard, each block in the flowchart may represent a module, segment, or portion of code, which comprises one or more executable instructions for implementing the specified logical function(s). In some alternative implementations, the functions noted in the block may occur simultaneously, substantially concurrently, or out of the order noted in the figure. Each block of the flowchart and combinations of blocks in the flowchart can be implemented by special-purpose hardware-based systems that perform the specified functions or acts, or combinations of special purpose hardware and computer instructions.

At block 302, the computing service 120 obtains natural language content (e.g., natural language content 202) corresponding to audio input from a user. The natural language content may include a request to process a certain type of information (e.g., tax expense information type 206). In one embodiment, the computing service 120 may receive the natural language content from a computing device associated with the user (e.g., client device 110, computing device(s) 130). For example, the natural language content may be received via at least one application programming interface (API) associated with the computing device. In another embodiment, the computing service 120 may generate the natural language content (at the computing service 120). For example, the computing service 120 may receive audio input from the user and use one or more natural language processing techniques to generate the natural language content.

At block 304, the computing service 120 determines whether the natural language content includes a first type of information (e.g., tax expense information type 206). In certain embodiments, the computing service 120 may evaluate the natural language content with a first ML model (e.g., ML model 204) to determine whether the natural language content includes the first type of information. If the natural language content does not include the first type of information (e.g., the natural language content may include a second type of information such as non tax expense information), then, at block 306, the computing service 120 generates and transmits a message indicating that the natural language content does not include the first type of information.

On the other hand, if the natural language content does include the first type of information, then, at block 308, the computing service 120 determines a temporal association (e.g., tax filing period 212) of the first type of information. In one embodiment, the first type of information includes a first type of tax expense information (e.g., tax expense information type 206) of multiple types of tax expense information. In this embodiment, determining the temporal association includes determining which tax filing period (e.g., tax filing period 212) of multiple tax filing periods is associated with the first type of tax expense information.

At block 310, the computing service 120 process the first type of information, based on the temporal association. In one embodiment, the computing service 120 processes the first type of information by associating the first type of information with at least one content item (e.g., tax return), based on the temporal association, and storing the first type of information in a storage system (e.g., storage system 250) in association with the at least one content item.

At block 312, the computing service 120 generates and transmits a message (e.g., message 214) indicating that the first type of information has been processed. In one embodiment, the message includes a link that allows the user to upload at least one content item (e.g., receipt, documentation of the tax expense, etc.) associated with the first type of information to a storage system. In this embodiment, the flowchart 300 may further include retrieving the at least one content item from the storage system and storing the at least one content item in association with the first type of information in a storage system (e.g., storage system 250), based on the temporal association of the first type of information. Additionally, in this embodiment, the flowchart 300 may further include processing the first type of information, based on the temporal association of the first type of information and the at least one content item. For example, processing the first type of information may include verifying the temporal association (e.g., tax filing period 212) of the first type of information based on the at least one content item.

At block 314, the computing service 120 presents the first type of information and the temporal association on a computing device associated with the user. For example, the first type of information along with the temporal association may be presented on a user interface (e.g., user interface 102) of the computing device (e.g., client device 110). The computing service 120 may also provide one or more elements within the user interface that allow the user to verify the temporal association of the first type of information, modify the temporal association of the first type of information, confirm adding the first type of information to the user's tax return, or remove the first type of information from the user's tax return.

Figure 4:
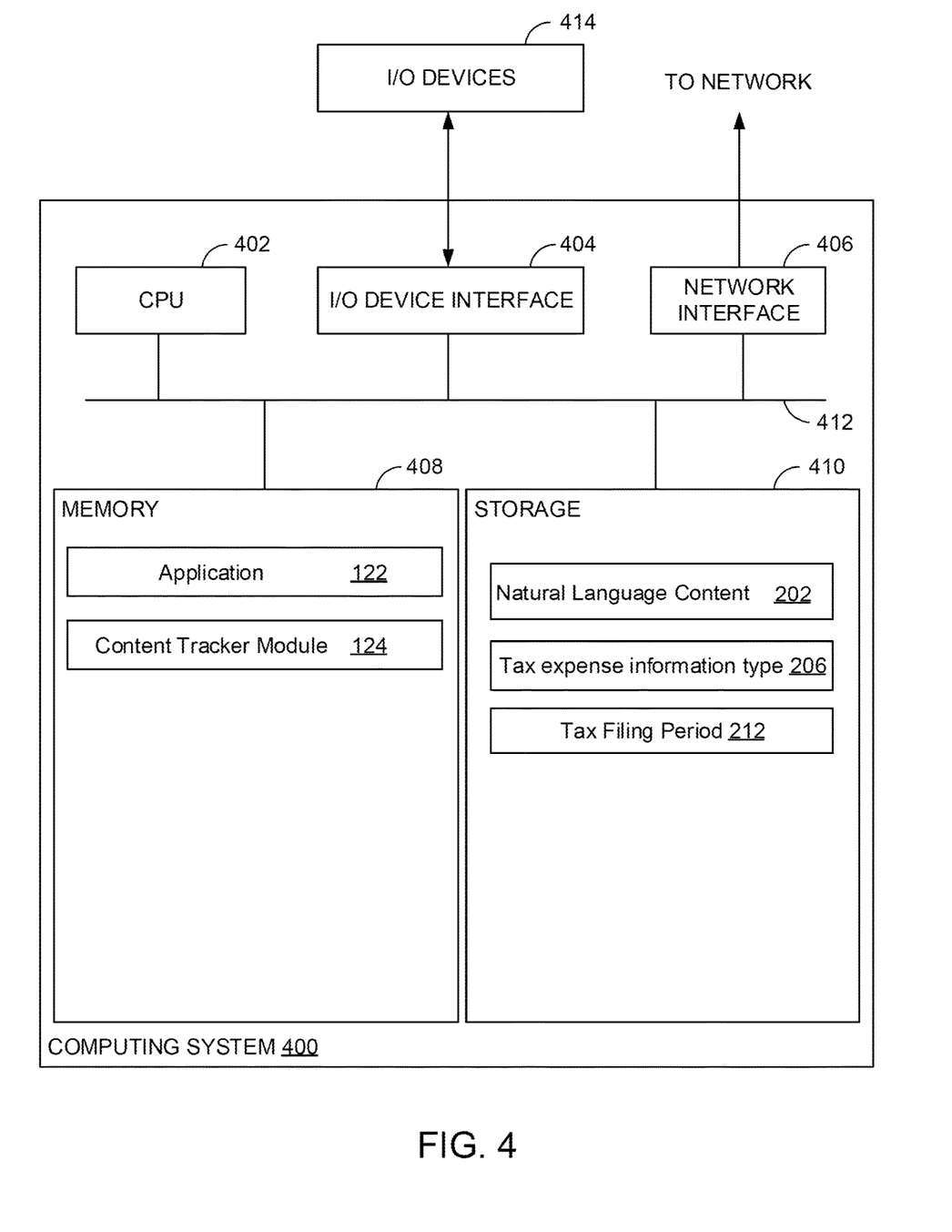
FIG. 4 illustrates an example computing system that performs content tracking based on audio input from a user, in accordance with certain embodiments.

FIG. 4 illustrates an exemplary computing system 400 that performs content tracking based on audio input from a user in accordance with aspects of the present disclosure. The computing system 400 is a representative example of computing service 120 depicted in FIG. 1. As shown, the computing system 400 includes a central processing unit (CPU) 402, one or more I/O device interfaces 404, which may allow for the connection of various I/O devices 414 (e.g., keyboards, displays, mouse devices, pen input, etc.) to computing system 400, network interface 406 (which may include a transmitter for transmitting data and a receiver for receiving data), memory 408, storage 410, and interconnect 412. Storage 410 can be located either inside or outside the computing system 400. When the storage is located outside computing system 400, the storage can be connected via the network 140.

CPU 402 may retrieve and execute programming instructions stored in the memory 408. Similarly, CPU 402 may retrieve and store application data residing in the memory 408. Interconnect 412 transmits programming instructions and application data, among the CPU 402, I/O device interface 404, network interface 406, memory 408, and storage 410. CPU 402 can represent a single CPU, multiple CPUs, a single CPU having multiple processing cores, and the like. Additionally, memory 408 may represent volatile memory, such as random access memory. Furthermore, storage 410 may represent non-volatile memory, such as memory on a disk drive. Although shown as a single unit, storage 410 may be a combination of fixed or removable storage devices, such as fixed disc drives, removable memory cards or optical storage, network attached storage (NAS), or a storage area-network (SAN). As shown, memory 408 stores programming instructions for executing web application 122 and content tracker module 124, described in more detail above. Storage 410 stores natural language content 202, tax expense information type 206, and tax filing period 212, described in more detail above.

Example Clauses

Clause 1: A method comprising: receiving natural language content corresponding to audio input from a user; determining whether the natural language content comprises a first type of information, based on evaluating the natural language content with a first machine learning model; and in response to determining the natural language content comprises the first type of information: determining a temporal association of the first type of information, based on evaluating the natural language content with a second machine learning model; and transmitting to the user a message comprising an indication of the temporal association of the first type of information.

Clause 2: The method of Clause 1, further comprising processing the first type of information, based on the temporal association of the first type of information, wherein processing the first type of information comprises: associating the first type of information with at least one content item, based on the temporal association; and storing the first type of information in a storage system in association with the at least one content item.

Clause 3: The method of any one of Clauses 1 through 2, wherein the message further comprises an indication that the first type of information has been processed.

Clause 4: The method of any one of Clauses 1 through 3, wherein: the first type of information comprises tax expense information; and determining the temporal association of the first type of information comprises determining which tax filing period of a plurality of tax filing periods is associated with the tax expense information.

Clause 5: The method of any one of Clauses 1 through 4, wherein: the first type of information comprises a first type of tax expense information of a plurality of types of tax expense information; and determining the temporal association of the first type of information comprises determining which tax filing period of a plurality of tax filing periods is associated with the first type of tax expense information.

Clause 6: The method of Clause 5, wherein the at least one content item comprises a tax return corresponding to the tax filing period.

Clause 7: The method of any one of Clauses 1 through 6, wherein: the natural language content comprises a request to process the first type of information; and the method further comprises, in response to determining that the natural language content comprises a second type of information, transmitting to the user a message comprising an indication that the second type of information is not valid and that the second type of information has not been applied to at least one content item associated with the user.

Clause 8: The method of any one of Clauses 1 through 7, further comprising presenting the first type of information and the temporal association of the first type of information on a user interface of a computing device associated with the user.

Clause 9: The method of Clause 8, further comprising providing one or more elements within the user interface that allow the user to at least one of (i) verify the temporal association of the first type of information, (ii) modify the temporal association of the first type of information, or (iii) remove the first type of information from at least one content item associated with the user.

Clause 10: The method of any one of Clauses 1 through 9, wherein: the message further comprises a link that allows the user to upload at least one content item associated with the first type of information to a first storage system, and the method further comprises: receiving the at least one content item from the first storage system; and storing the at least one content item in association with the first type of information in a second storage system, based on the temporal association of the first type of information.

Clause 11: The method of Clause 10, further comprising processing the first type of information, based on the temporal association of the first type of information and the at least one content item, wherein processing the first type of information comprises verifying the temporal association of the first type of information based on the at least one content item.

Clause 12: The method of any one of Clauses 1 through 11, wherein the natural language content is received via an application programming interface (API) associated with a computing system.

Clause 13: The method of Clause 12, wherein the computing system comprises a smart home device or a mobile device.

Clause 14: A method for automatically tracking tax expense information based on audio input from a user, the method comprising: receiving natural language content corresponding to audio input from a user; determining whether the natural language content comprises tax expense information, based on evaluating the natural language content with a first machine learning model; in response to determining the natural language content comprises the tax expense information: determining a type of the tax expense information based on the evaluation; determining which tax filing period of a plurality of tax filing periods are associated with the type of the tax expense information, based on evaluating the natural language content with a second machine learning model; and automatically processing the type of the tax expense information on behalf of the user, comprising: associating the type of the tax expense information with at least one content item, based on the tax filing period associated with the type of the tax expense information; and storing the type of the tax expense information in a storage system in association with the at least one content item; presenting the type of the tax expense information and the associated tax filing period on a user interface of a computing device associated with the user; and providing one or more elements within the user interface that allow the user to at least one of (i) verify the tax filing period associated with the type of tax expense information, (ii) modify the tax filing period associated with the type of tax expense information, or (iii) remove the type of tax expense information from the at least one content item.

Clause 15: A system comprising: a memory having executable instructions stored thereon; and a processor configured to execute the executable instructions to cause the system to: receive natural language content corresponding to audio input from a user; determine whether the natural language content comprises a first type of information, based on evaluating the natural language content with a first machine learning model; and in response to determining the natural language content comprises the first type of information: determine a temporal association of the first type of information, based on evaluating the natural language content with a second machine learning model; and transmit to the user a message comprising an indication of the temporal association of the first type of information.

Clause 16: The system of Clause 15, wherein the processor is further configured to execute the executable instructions to cause the system to process the first type of information, based on the temporal association of the first type of information, wherein processing the first type of information comprises: associating the first type of information with at least one content item, based on the temporal association; and storing the first type of information in a storage system in association with the at least one content item.

Clause 17: The system of any one of Clauses 15 through 16, wherein the message further comprises an indication that the first type of information has been processed.

Clause 18: The system of any one of Clauses 15 through 17, wherein: the first type of information comprises tax expense information; and determining the temporal association of the first type of information comprises determining which tax filing period of a plurality of tax filing periods is associated with the tax expense information.

Clause 19: The system of any one of Clauses 15 through 18, wherein the at least one content item comprises a tax return corresponding to the tax filing period.

Clause 20: The system of any one of Clauses 15 through 19, wherein the processor is further configured to execute the executable instructions to cause the system to: present the first type of information and the temporal association of the first type of information on a user interface of a computing device associated with the user; and provide one or more elements within the user interface that allow the user to at least one of (i) verify the temporal association of the first type of information, (ii) modify the temporal association of the first type of information, or (iii) remove the first type of information from at least one content item associated with the user.

Clause 21: An apparatus comprising: a memory having executable instructions stored thereon; and a processor configured to execute the executable instructions to cause the apparatus to perform the methods of any one of Clauses 1 through 14.

Clause 22: An apparatus comprising: means for performing the methods of any one of Clauses 1 through 14.

Clause 23: A computer-readable medium having instructions stored thereon which, when executed by a processor, performs the methods of any one of Clauses 1 through 14.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   receiving natural language content corresponding to audio input from a user;
   determining whether the natural language content comprises a first type of information, based on evaluating the natural language content with a first machine learning model; and
   in response to determining the natural language content comprises the first type of information:
      determining a temporal association of the first type of information, based on evaluating the natural language content with a second machine learning model, wherein the second machine learning model was trained to output an indication of a time period in response to input natural language content, and wherein the temporal association comprises an association between the first type of information and a given time period of a plurality of time periods; and
      transmitting to the user a message comprising an indication of the temporal association of the first type of information.

2. The method of claim 1, further comprising processing the first type of information, based on the temporal association of the first type of information, wherein processing the first type of information comprises:
   associating the first type of information with at least one content item, based on the temporal association; and
   storing the first type of information in a storage system in association with the at least one content item.

3. The method of claim 2, wherein the message further comprises an indication that the first type of information has been processed.

4. The method of claim 2, wherein:
   the first type of information comprises tax expense information; and
   determining the temporal association of the first type of information comprises determining which tax filing period of a plurality of tax filing periods is associated with the tax expense information.

5. The method of claim 2, wherein:
   the first type of information comprises a first type of tax expense information of a plurality of types of tax expense information; and
   determining the temporal association of the first type of information comprises determining which tax filing period of a plurality of tax filing periods is associated with the first type of tax expense information.

6. The method of claim 5, wherein the at least one content item comprises a tax return corresponding to the tax filing period.

7. The method of claim 1, wherein:
   the natural language content comprises a request to process the first type of information; and
   the method further comprises, in response to determining that the natural language content comprises a second type of information, transmitting to the user a message comprising an indication that the second type of information is not valid and that the second type of information has not been applied to at least one content item associated with the user.

8. The method of claim 1, further comprising presenting the first type of information and the temporal association of the first type of information on a user interface of a computing device associated with the user.

9. The method of claim 8, further comprising providing one or more elements within the user interface that allow the user to at least one of (i) verify the temporal association of the first type of information, (ii) modify the temporal association of the first type of information, or (iii) remove the first type of information from at least one content item associated with the user.

10. The method of claim 1, wherein:
the message further comprises a link that allows the user to upload at least one content item associated with the first type of information to a first storage system, and the method further comprises:
receiving the at least one content item from the first storage system; and
storing the at least one content item in association with the first type of information in a second storage system, based on the temporal association of the first type of information.

11. The method of claim 10, further comprising processing the first type of information, based on the temporal association of the first type of information and the at least one content item, wherein processing the first type of information comprises verifying the temporal association of the first type of information based on the at least one content item.

12. The method of claim 1, wherein the natural language content is received via an application programming interface (API) associated with a computing system.

13. The method of claim 12, wherein the computing system comprises a smart home device or a mobile device.

14. A system comprising:
a memory having executable instructions stored thereon; and
a processor configured to execute the executable instructions to cause the system to:
receive natural language content corresponding to audio input from a user;
determine whether the natural language content comprises a first type of information, based on evaluating the natural language content with a first machine learning model; and
in response to determining the natural language content comprises the first type of information:
determine a temporal association of the first type of information, based on evaluating the natural language content with a second machine learning model, wherein the second machine learning model was trained to output an indication of a time period in response to input natural language content, and wherein the temporal association comprises an association between the first type of information and a given time period of a plurality of time periods; and
transmit to the user a message comprising an indication of the temporal association of the first type of information.

15. The system of claim 14, wherein the processor is further configured to execute the executable instructions to cause the system to process the first type of information, based on the temporal association of the first type of information, wherein processing the first type of information comprises:
associating the first type of information with at least one content item, based on the temporal association; and
storing the first type of information in a storage system in association with the at least one content item.

16. The system of claim 15, wherein the message further comprises an indication that the first type of information has been processed.

17. The system of claim 15, wherein:
the first type of information comprises tax expense information; and
determining the temporal association of the first type of information comprises determining which tax filing period of a plurality of tax filing periods is associated with the tax expense information.

18. The system of claim 17, wherein the at least one content item comprises a tax return corresponding to the tax filing period.

19. The system of claim 14, wherein the processor is further configured to execute the executable instructions to cause the system to:
present the first type of information and the temporal association of the first type of information on a user interface of a computing device associated with the user; and
provide one or more elements within the user interface that allow the user to at least one of (i) verify the temporal association of the first type of information, (ii) modify the temporal association of the first type of information, or (iii) remove the first type of information from at least one content item associated with the user.

20. A method for automatically tracking tax expense information based on audio input from a user, the method comprising:
receiving natural language content corresponding to audio input from a user;
determining whether the natural language content comprises tax expense information, based on evaluating the natural language content with a first machine learning model;
in response to determining the natural language content comprises the tax expense information:
determining a type of the tax expense information based on the evaluation;
determining which tax filing period of a plurality of tax filing periods are associated with the type of the tax expense information, based on evaluating the natural language content with a second machine learning model, wherein the second machine learning model was trained to output an indication of a tax filing period in response to input natural language content; and
automatically processing the type of the tax expense information on behalf of the user, comprising:
associating the type of the tax expense information with at least one content item, based on the tax filing period associated with the type of the tax expense information; and
storing the type of the tax expense information in a storage system in association with the at least one content item;
presenting the type of the tax expense information and the associated tax filing period on a user interface of a computing device associated with the user; and providing one or more elements within the user interface that allow the user to at least one of (i) verify the tax filing period associated with the type of tax expense information, (ii) modify the tax filing period associated with the type of tax expense information, or (iii) remove the type of tax expense information from the at least one content item.

\* \* \* \* \*